US012000691B2

United States Patent
Ohanian, III et al.

(10) Patent No.: US 12,000,691 B2
(45) Date of Patent: Jun. 4, 2024

(54) ONE OR MORE FIBER OPTIC SENSORS LOCALLY BONDED WITH A FLEXIBLE FILAMENT STRUCTURE

(71) Applicant: LUNA INNOVATIONS INCORPORATED, Roanoke, VA (US)

(72) Inventors: Osgar John Ohanian, III, Blacksburg, VA (US); Matthew Anthony Davis, Christiansburg, VA (US)

(73) Assignee: LUNA INNOVATIONS INCORPORATED, Roanoke, VA (US)

( * ) Notice: Subject to any disclaimer, the term of this patent is extended or adjusted under 35 U.S.C. 154(b) by 126 days.

(21) Appl. No.: 17/638,458

(22) PCT Filed: Aug. 27, 2020

(86) PCT No.: PCT/US2020/048103
§ 371 (c)(1),
(2) Date: Feb. 25, 2022

(87) PCT Pub. No.: WO2021/041605
PCT Pub. Date: Mar. 4, 2021

(65) Prior Publication Data
US 2022/0316865 A1    Oct. 6, 2022

Related U.S. Application Data

(60) Provisional application No. 62/893,891, filed on Aug. 30, 2019.

(51) Int. Cl.
*G01D 5/353* (2006.01)
*G01B 11/16* (2006.01)
(Continued)

(52) U.S. Cl.
CPC ......... *G01B 11/18* (2013.01); *G01D 5/35374* (2013.01); *G01L 1/246* (2013.01); *G02B 6/4298* (2013.01)

(58) Field of Classification Search
CPC .... G01B 11/18; G01D 5/35374; G01L 1/246; G02B 6/4298; G02B 6/02395; G02B 6/3628; G02B 2006/12138; G01M 5/0091
See application file for complete search history.

(56) References Cited

U.S. PATENT DOCUMENTS 5,044,205 A * 9/1991 Wolff ...................... G01B 11/18
                                                       250/227.14
10,180,338 B1 * 1/2019 Bradbury ........... G01D 5/35338
(Continued)

FOREIGN PATENT DOCUMENTS

CN         106926532         7/2017

OTHER PUBLICATIONS

International Preliminary Report on Patentability for PCT/US2020/048103 dated Aug. 14, 2021, 23 pages.
(Continued)

*Primary Examiner* — Tony Ko
(74) *Attorney, Agent, or Firm* — NIXON & VANDERHYE P.C.

(57) ABSTRACT

An apparatus comprises a flexible filament structure, and a fiber optic sensor with a buffer material that locally bonds the fiber optic sensor to the flexible filament structure to create a bond between the fiber optic sensor and the flexible filament structure to transfer strain from the flexible filament structure to the fiber optic sensor to allow the fiber optic sensor to detect strain on the flexible filament structure while maintaining flexibility in the flexible filament structure. A fiber optic interrogator may be optically coupled to the fiber optic sensor and configured to measure strain. A method comprises embedding a fiber optic sensor with a buffer material in or on a flexible filament structure. Thereafter, the buffer material is activated via heating or curing to locally adhere the fiber optic sensor to the flexible filament structure
(Continued)

Buffer coated optical fiber before heating

Buffer coated optical fiber after heating to create a local bond. The local bond transfers strain from the flexible filament structure to the fiber optic sensor.

29 Claims, 17 Drawing Sheets

(51) Int. Cl.
    *G01L 1/24*     (2006.01)
    *G02B 6/42*     (2006.01)

(56) References Cited

U.S. PATENT DOCUMENTS

| | | |
|---|---|---|
| 2003/0127587 A1 | 7/2003 | Udd et al. |
| 2005/0146076 A1 | 7/2005 | Alexander et al. |
| 2012/0082422 A1 | 4/2012 | Sarchi et al. |
| 2015/0114130 A1 | 4/2015 | White et al. |

OTHER PUBLICATIONS

International Search Report and Written Opinion of the ISA for PCT/US2020/048103 dated Nov. 20, 2020, 13 pages.

* cited by examiner

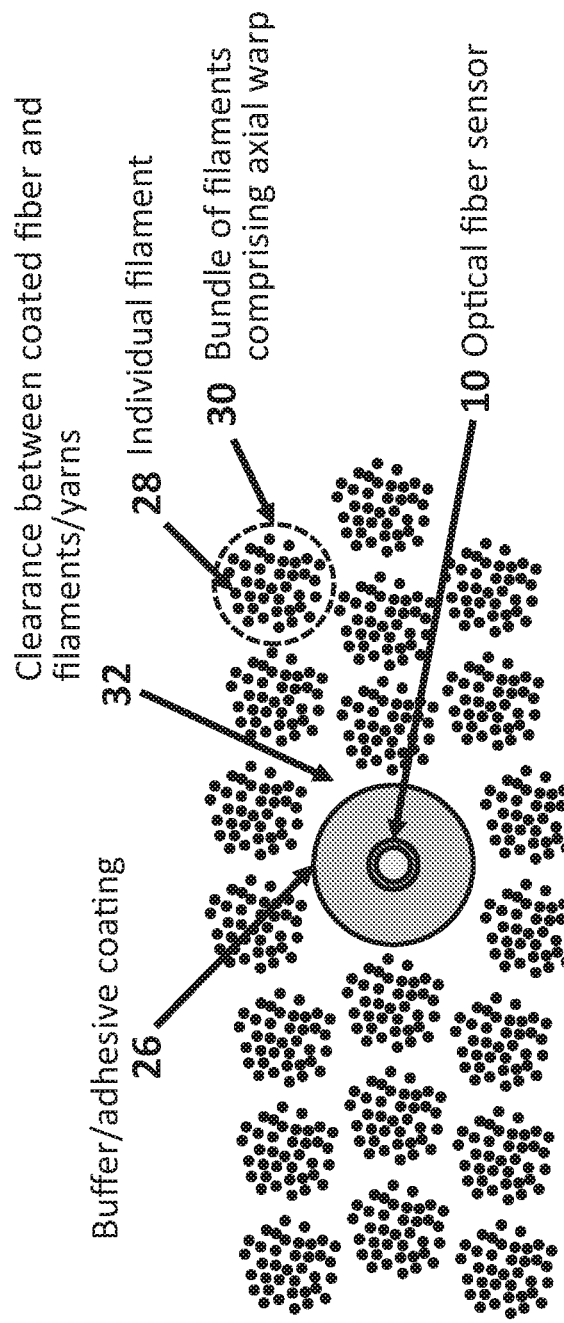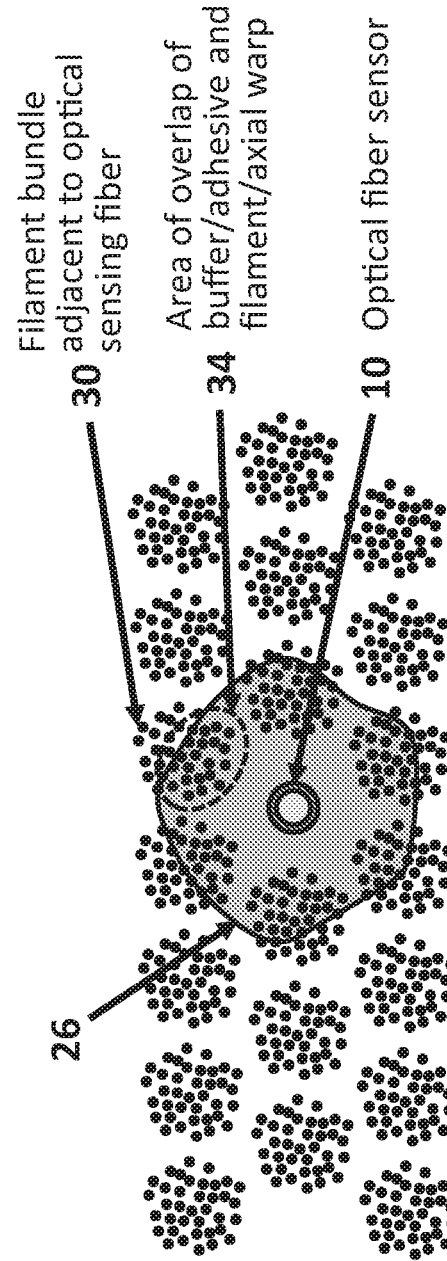
FIG. 3A — Buffer coated optical fiber before heating
FIG. 3B — Buffer coated optical fiber after heating

ONE OR MORE FIBER OPTIC SENSORS LOCALLY BONDED WITH A FLEXIBLE FILAMENT STRUCTURE

CROSS-REFERENCE TO RELATED APPLICATION

This application is the U.S. national phase of International Application No. PCT/US2020/048103 filed Aug. 27, 2020 which designated the U.S. and claims priority to U.S. Provisional Patent Application No. 62/893,891 filed Aug. 30, 2019, the entire contents of each of which are hereby incorporated by reference.

STATEMENT REGARDING FEDERALLY SPONSORED RESEARCH OR DEVELOPMENT

This invention was made with US Government support under Contract No. NNX17CJ06C, awarded by the National Aeronautics and Space Administration. The Government has certain rights to the invention.

INTRODUCTION

Many applications may benefit from having sensing optical fiber integrated into flexible filament structures for the purpose of structural health monitoring and identifying occurrence, location, severity and nature of damage. Flexible filament structures are assemblies of multiple filaments, which may be elements made up of long thin fibers or threads that may be singular or bound together into larger elements, that are further bound into larger assemblies, that may be bent into different shapes when in use. These flexible filament structures (such as webbing, straps, ropes, cords, textiles, fabric, any flexible material used for securing, holding together, or wrapping, etc.) may function as primary load-bearing structures or secondary structures, e.g., for reinforcement, strengthening, improving flexibility, reliability, lifetime, etc., for various applications such as inflatable space habitats, load handling straps, seat restraints, fabrics, clothing, civil structures for soil retention, rock fall mitigation, landslide detection, and other applications that use a woven configuration, e.g., for reinforcement, etc. The sensing optical fiber needs to be sufficiently connected or coupled to the flexible filament structure in order to transfer strain from the flexible filament structure to the optical fiber sensor so that the strain on the flexible filament structure can be accurately measured. When damage occurs to the flexible filament structure, a strain profile as measured by the optical fiber sensor changes, often displaying a local increase in the measured strain near where the flexible filament structure was damaged. If the optical fiber sensor is not adequately coupled or connected to the flexible filament structure, then even though damage to the flexible filament structure alters the strain state of the structure, the strain will not be transferred to the sensor, and hence, not be measured accurately, or possibly not detected. Likewise, if the sensor is not adequately coupled to the flexible filament structure and if an undamaged flexible filament structure is loaded, then the sensor strain measurement will not accurately represent the applied forces on the structure.

SUMMARY

At least some examples provide an apparatus comprised of a flexible filament structure, and a fiber optic sensor with a buffer material that locally bonds the fiber optic sensor to the flexible filament structure. The local bond created between the fiber optic sensor and the flexible filament structure transfers strain from the flexible filament structure to the fiber optic sensor to allow the fiber optic sensor to detect strain on the flexible filament structure while maintaining flexibility in the flexible filament structure. The local bond preferably (though not necessarily) provides a uniform strain coupling between the fiber optic sensor to detect strain on the flexible filament structure and the fiber optic sensor.

The buffer material may include for example one or more of: a thermoplastic, a thermoset resin, an adhesive, a flexible polymer, a buffer material designed to maximize strain coupling between the fiber optic sensor and the flexible filament structure, and/or a buffer material designed to maximize frictional coupling between the fiber optic sensor and the flexible filament structure.

The fiber optic sensor may include an optical fiber with a fiber coating and the buffer material is on top of the fiber coating. Alternatively, the fiber optic sensor may include an optical fiber with the buffer material on top of the fiber.

The fiber optic sensor may include an optical fiber embedded within the flexible filament structure along a longitudinal axis of the flexible filament structure. In another example configuration, the fiber optic sensor may include an optical fiber embedded within the flexible filament structure along two or more longitudinal parallel axes of the flexible filament structure or along axes that are not parallel, with one end of the optical fiber being a fiber termination and the other end of the optical fiber coupled to a connector. In yet another example configuration, the fiber optic sensor includes two or more optical fibers embedded within the flexible filament structure along two or more longitudinal parallel axes of the flexible filament structure or along axes that are not parallel, with one end of each optical fiber being a fiber termination and the other end of each optical fiber coupled to a connector.

The fiber optic sensor is bendable with the flexible filament structure to detect one or more of: (i) bending of the flexible filament structure in a plane that contains a longitudinal axis of the flexible filament structure, (ii) bending out of the plane, and (iii) axial strain along longitudinal axis of the filament structure.

As examples, the flexible filament structure may include one or more of: Kevlar, Vectran, Nylon, Polyester, and cotton or other synthetic or organic-based fibers.

An example of a flexible filament structure is a woven structure having one or more of: axial filaments, lateral filaments, and vertical filaments. In a further example configuration, the woven structure may include a first layer of axial filaments and lateral filaments and a second layer of axial filaments and lateral filaments, wherein the vertical filaments extend to couple the first layer and the second layer, and wherein one or more fiber optic sensors are embedded between the first layer and the second layer.

At least some examples provide a system comprising a flexible filament structure, and a fiber optic sensor with a buffer material that locally bonds the fiber optic sensor to the flexible filament structure to create a bond between the fiber optic sensor and the flexible filament structure. The local bond transfers strain from the flexible filament structure to the fiber optic sensor to allow the fiber optic sensor to detect strain on the flexible filament structure while maintaining flexibility in the flexible filament structure. A fiber optic interrogator is optically coupled to the fiber optic sensor and is configured to measure strain with high spatial resolution.

In an example embodiment, the fiber optic interrogator may be an optical frequency domain reflectometry (OFDR)- based interrogator to measure strain in a continuous fashion with high spatial resolution based on light reflections from Rayleigh scatter in the fiber optic sensor. In another example embodiment, the fiber optic interrogator may be an optical frequency domain reflectometry (OFDR)-based interrogator to measure strain based on light reflections from fiber Bragg gratings (FBG) in the fiber optic sensor.

The fiber optic interrogator may be configured in examples to use one or more of: Raman scatter, Brillouin scatter, FBG point sensors, distributed FBG sensors to measure strain in the fiber optic sensor.

In another example embodiment, the fiber optic interrogator is configured to localize strain information associated with the fiber optic sensor using optical time domain reflectometry (OTDR) or wavelength division multiplexing (WDM).

In some examples, the fiber optic interrogator is configured to determine distributed strain along a longitudinal axis of the flexible filament structure and to determine from the distributed strain one or more of the following: an applied load to the flexible filament structure, damage to the flexible filament structure, pressure on the flexible filament structure, a material creep of the flexible filament structure, in-plane and/or out-of-plane bending or curvature of the flexible filament structure, and a location and direction of damage to the flexible filament structure.

At least some examples provide a method comprising embedding a fiber optic sensor with a buffer material in or on a flexible filament structure. Thereafter, the buffer material is activated via heating to locally adhere the fiber optic sensor to the flexible filament structure to create a local bond. The local bond transfers strain from the flexible filament structure to the fiber optic sensor to allow the fiber optic sensor to detect strain on the flexible filament structure while maintaining flexibility in the flexible filament structure.

Example heating activation uses one or more of conduction, convection, radiation, and induction.

In an example embodiment, the fiber optic sensor includes an optical fiber with a fiber coating, and the method comprises forming the buffer material on the fiber coating.

In an example embodiment, the woven structure flexible filament structure may be generated using axial filaments, lateral filaments, and vertical filaments. The woven structure may include a first layer of axial filaments and lateral filaments and a second layer of axial filaments and lateral filaments and the vertical filaments extend to couple the first layer and the second layer. One or more fiber optic sensors may be embedded between the first layer and the second layer.

BRIEF DESCRIPTION OF THE FIGURES

FIG. 3A illustrates a sensor fiber embedded with a buffer material providing strain coupling;

FIG. 3B illustrates the sensor fiber with a buffer material after activation or heating of the buffer material to enhance strain coupling to the flexible filament structure;

DETAILED DESCRIPTION OF EXAMPLE EMBODIMENTS

Figure 1A:
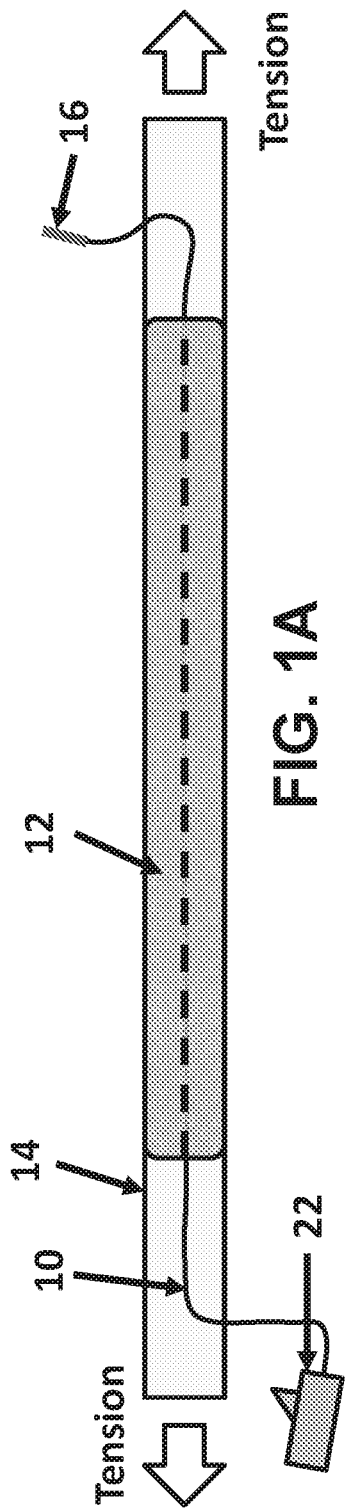
FIG. 1A shows an example fiber optic sensor embedded in a flexible structure.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

One or more distributed sensing optical fibers useable for distributed optical sensing is externally or internally attached or integrated (e.g., woven) into a flexible filament structure and then bonded, adhered, or impregnated with a polymer or an epoxy resin to create a bond or coupling between the fiber and the flexible filament structure so that strain may be transferred from the flexible filament structure to the sensing fiber. In various example embodiments, the sensing fiber may be bonded to the flexible filament structure with different types of polymers with characteristics that may affect the properties of the final structure. For example, a stiffer polymer tends to transfer the strain better than a softer polymer. But a tradeoff with a stiffer polymer is that the flexible filament structure may more readily stiffen to a point where it is less easily manipulated. This may be more of a problem in example applications which require the flexible filament structure to be folded for storage or transport. Softer polymers permit easier manipulation. A stiffer polymer also changes the stiffness of the structure that the flexible filament structure is built into and the overall material properties of the flexible filament structure.

U.S. Pat. No. 5,770,155 describes embedding a fiber in a composite structure in which the resin that couples strain from the structure to the fiber is spread through the entire structure, resulting in a rigid structure. But for many applications, it is desired that a flexible filament structure retain a high degree of flexibility. U.S. patent publication 20110058767A1 describes weaving a fiber optic sensor into a woven structure, but the fiber optic sensor is not bonded or well coupled to the structure, resulting in poor and inconsistent strain transfer from the structure to the fiber sensor. The technology in this application describes attaching the optical fiber sensor to the flexible filament structure so that that strain transfers to the fiber sensor with high efficiency and uniformity without compromising the flexibility of the structure.

In an example embodiment, a distributed fiber optical sensor is bonded to a woven strap that is preferably (though not necessarily) flexible. The term strap is used in the application as an example of a woven structure, where a woven structure is a non-limiting example of a flexible filament structure. It is to be understood that the technology described in this application is not limited to woven straps or woven structures and that the description applies to all flexible filament structures.

The woven strap may be made of one material or a combination of materials. One example material that may be used is Kevlar. Other example materials include Vectran, Nylon, Polyester, cotton and other synthetic and organic-based fibers. The bonding material that connects the sensor to the woven structure may be applied via saturation, foam, spray or print bonding techniques, typically with solvent release or thermal set-up; introduced as a film or filament separate from the sensor fiber or woven structure; or introduced as a coating on the sensor fiber. In the case in which the bonding material is introduced as a coating on the sensor fiber, the bond between the sensor fiber and flexible filament structure could be physical (with the coating in frictional contact with the structural elements) or with the coating enveloping the structural filaments, or chemical (ionic bonds or covalent bonds). Example bonding materials include polymers; epoxies; resins; cyanoacrylate, urethane, and acrylic adhesives. Bonding material properties may be selected to suit the type of bond desired. For example, for a chemical bond, a bonding material with superior adhesion strength to both the filament material and the sensor fiber material is preferable but not essential. For a frictional bond, the bonding material may be designed with high surface roughness or a irregular shape, and with compressibility to enhance the static frictional constant between the bonding material and the structural filaments. If a mechanical bond in which the buffer material is melted so that it envelops the sensor element and local structural filaments, the bonding material may be selected to have a melting temperature low enough that the sensor fiber and structural filaments are not damaged, but high enough that the bond is not weakened over an anticipated temperature range of use.

FIG. 1A shows a non-limiting example embodiment of a fiber optic sensor 10 embedded in a polymer matrix 12 that covers a flexible filament structure which in this example is a woven structure 14. In one example embodiment, the woven structure 14 may be bonded to the fiber optic sensor 10 by melting a thermoplastic material (an example of the flexible polymer matrix 12) on the fiber optic sensor 10. For example, the fiber optic sensor 10 may be coated with a thermoplastic adhesive or other polymer or resin system. The coated fiber optic sensor 10 may be also woven into and bonded with the woven structure 14.

Figure 1B:
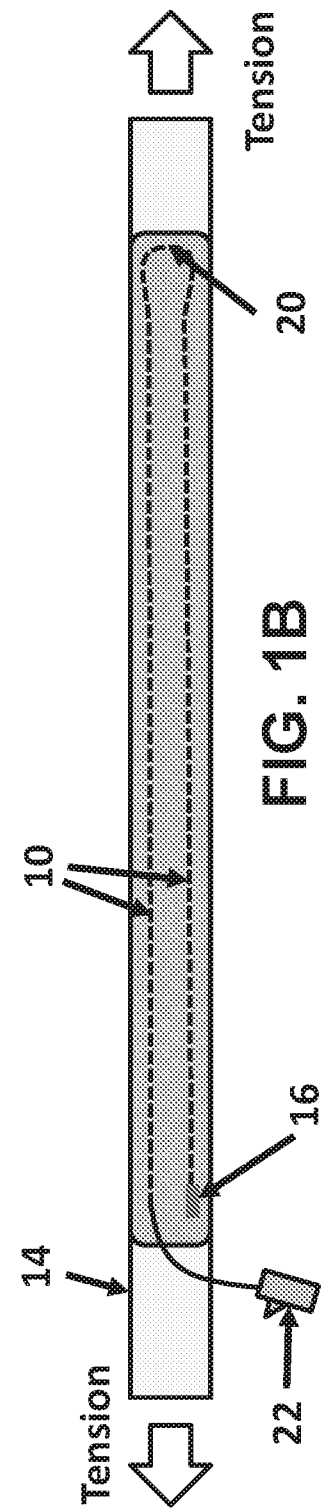
FIG. 1B shows another example fiber optic sensor embedded in a flexible structure.

FIG. 1B shows another example embodiment that includes two passes of a fiber optic sensor 10 in a single woven structure 14. The fiber termination 16 and 180 degree turnaround 20 may be embedded in the buffer material to make the woven strap more rugged for handling, leaving only a single fiber lead and connector 22 exiting the woven strap. This example embodiment allows sensing a directionality of damage (e.g., on the right side of the woven strap versus the left side), as well as sensing in-plane bending of the woven strap.

Figure 1C:
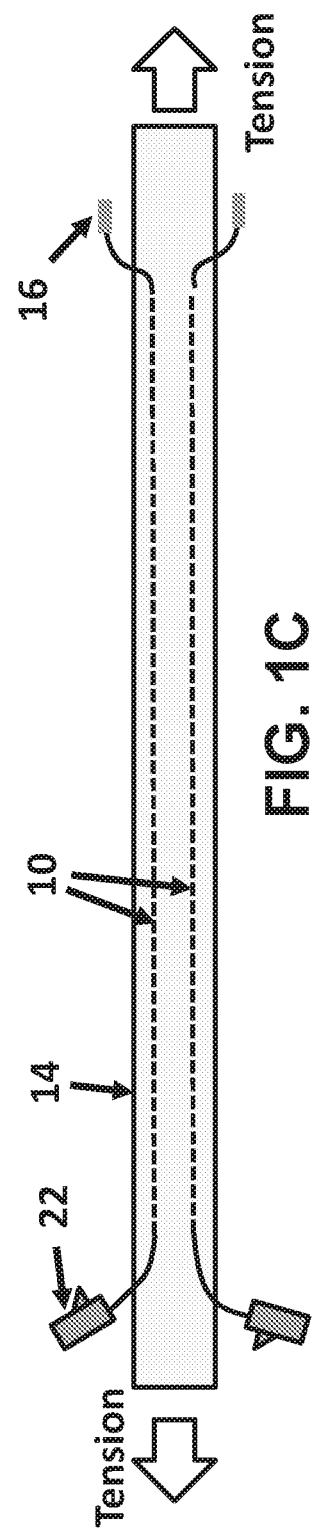
FIG. 1C shows an example of multiple fiber optic sensors embedded in a flexible structure.

FIG. 1C shows another example embodiment that includes two distinct fiber optic sensors 10 embedded in a woven structure 14. The fiber terminations 16 may be embedded in or exit from the woven structure 14. Each sensor is connected to a connector 22. This multiple sensor configuration also allows for sensing directionality of damage.

In one example embodiment, the fiber optic sensor 10 is woven along or near a neutral plane 11 (see FIG. 2A) of the woven structure 14 and then locally bonded. Local bonding, in which a bonding agent connects the sensor 10 to elements of the woven structure 14 that are immediately proximate to the sensor fiber (but not necessarily to all the filaments in the woven structure), produces a more flexible structure as compared to infusing a majority of or the entire woven structure 14 with a polymer or adhesive. One example embodiment applies an additional material or buffer material or layer (such the example shown in FIG. 10) on the fiber optic sensor 10 which is used to adhere the fiber optic sensor 10 to the flexible woven structure 14. When the fiber optic sensor 10 and woven structure 14 are bonded, the bonded fiber optic sensor 10 may be used to measure distributed strain in the woven structure 14.

Figure 2A:
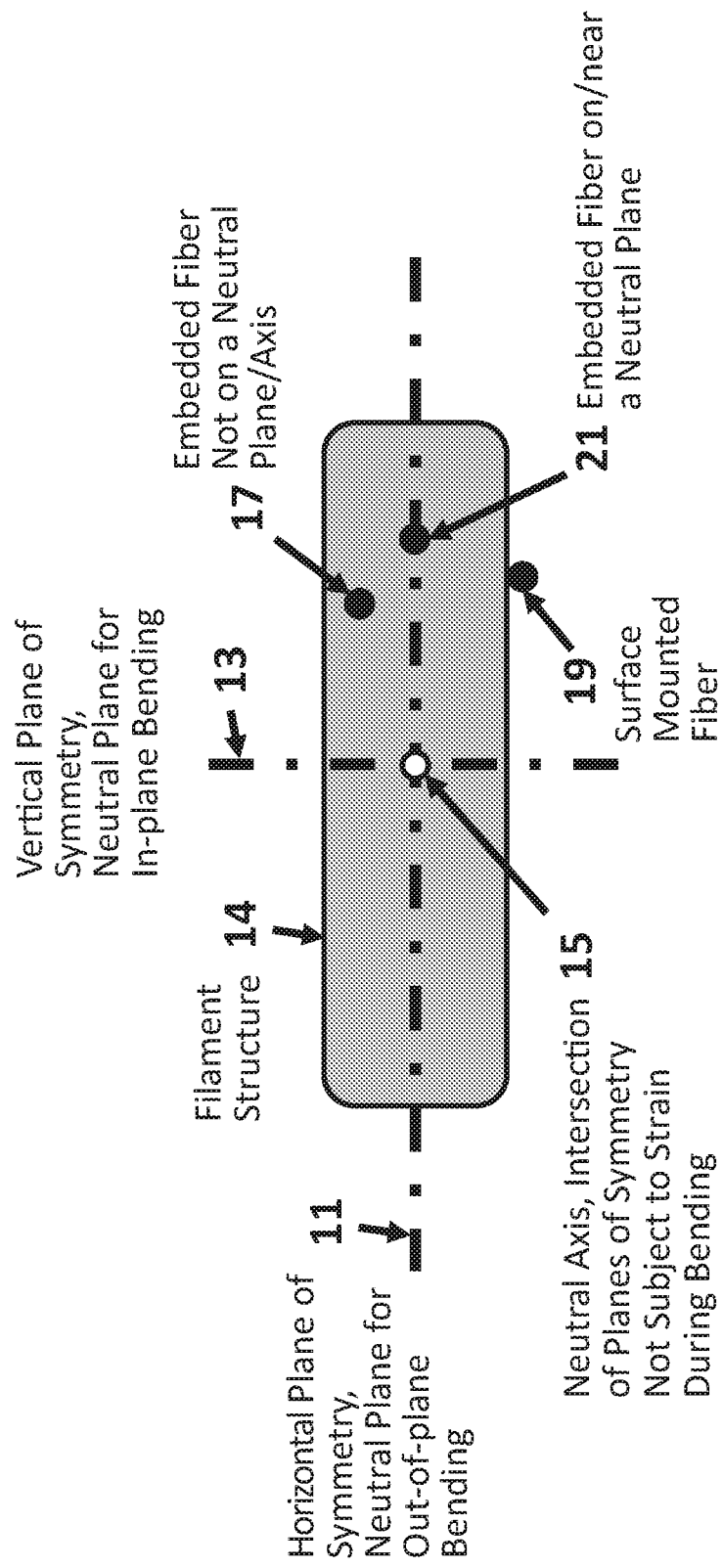
FIG. 2A illustrates a cross-section of a flexible filament structure with its neutral planes, neutral axis, and embedded and surface bonded fiber locations.

FIG. 2A shows a cross-section of a woven structure 14 and a horizontal neutral plane of symmetry 11 and a vertical neutral plane of symmetry 13, where both neutral planes extend in the longitudinal direction of the woven structure 14 (into and out of the page in the figure). These planes are neutral because there will be no axial strain when the woven structure is bent in a direction perpendicular the plane in question. For example, when the woven structure 14 is bent out of the horizontal plane 11, all points along the horizontal neutral plane 11 experience no axial strain. When the woven structure 14 is bent in the direction of the horizontal plane 11 and perpendicular to the vertical plane 13, all points along the vertical neutral plane 13 experience no axial strain. For points outside these planes but within the woven structure 14, axial compression or tension strain is experienced as a result of bending. The two neutral planes intersect at a neutral axis 15 of the woven structure 14. The neutral axis 15 does not experience axial strain from bending in any direction. A sensing optical fiber 21 located on the neutral plane 11 experiences no axial strain due to out-of-plane bending and also does not contribute to the bending stiffness of the woven structure 14. Other examples of locations for bonding optical fiber sensors are embedded in the woven structure but not on a neutral plane (see the example at point 17) or bonding on the surface 19 of the woven structure 14.

Figure 2B:
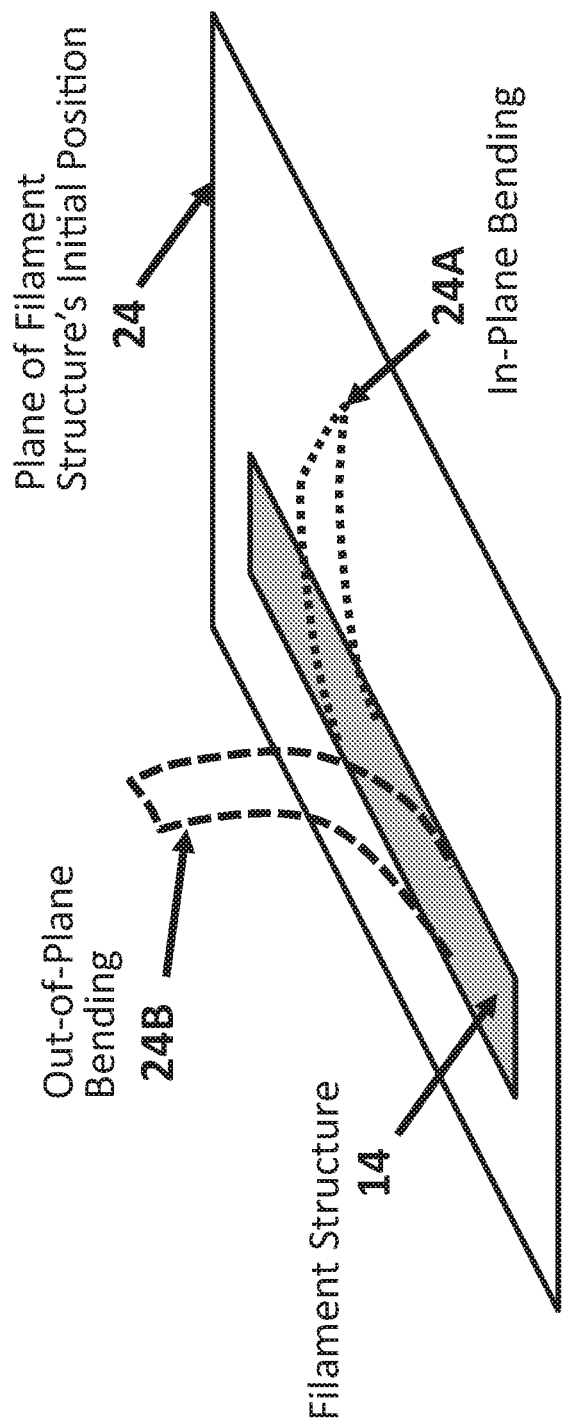
FIG. 2B illustrates a woven structure shown in a plane and bent in-plane laterally and out-of-plane.

FIG. 2B illustrates an example of a woven structure 14 shown in a plane 24 and also bendable "in-plane" within that plane laterally 24A or "out-of-plane" vertically 24B from the plane. Bending may occur if a weave pattern of the woven strap is shifted due to damage near the instrumented woven strap but not directly inflicted on it.

FIGS. 3A and 3B respectively illustrate embedding a sensor fiber 10 with a buffer material 26 before and after the buffer material is locally activated to provide enhanced strain coupling to the flexible filament structure. FIGS. 3A and 3B show a cross-section view of an example of a portion of the filament structure having an embedded optical fiber sensor 10 with a buffer/adhesive material 26. The filament structure is comprised of individual filaments 28 that may be bundled, collected, or twisted together to function as an axial warp element 30 in a woven structure. Before bonding, there may be physical clearance 32 (e.g., an air gap) between the buffer material 26 and the individual filaments 28. The fiber optic sensor 10 in FIG. 3A can exhibit friction bonding with the filaments 28 and bundles of filaments 30 without activation of the buffer material 26. Activation of the buffer material creates an enhanced bond to the structure (e.g., by heating or curing). Upon activation, the buffer material 26 may flow or wick into the adjacent filament bundles 30 forming an area of overlap 34 where additional bonding occurs, as shown in FIG. 3B. The bond may be physical or chemical (e.g., ionic or covalent). The bonding of the buffer material 26 with the optical fiber sensor 10 and the individual filaments 28 of the woven filament structure achieves improved strain coupling.

Figure 4:
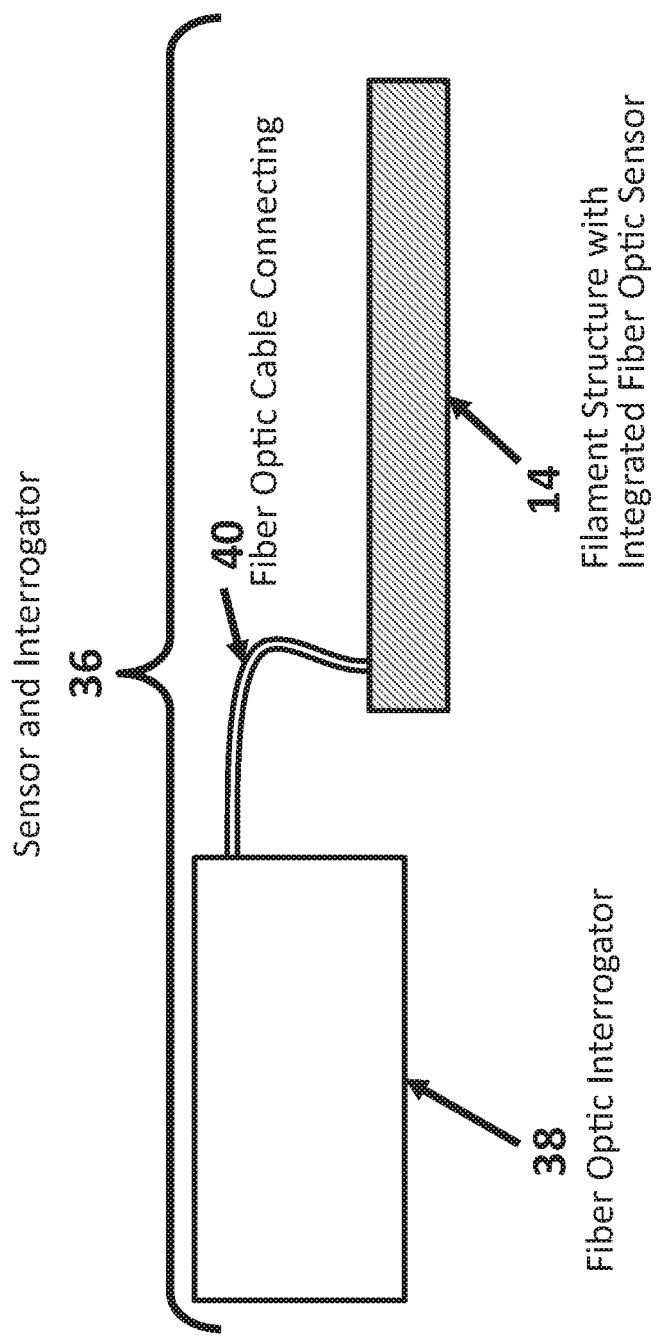
FIG. 4 shows an example embodiment of an interrogation system.

The integrated fiber optic sensor 10 in the woven structure 14 is connectable to a fiber optic interrogator 36, as shown in the example interrogation system 38 in FIG. 4, to measure strain. The interrogator 36 connects to a fiber optic sensor 10 bonded to a woven structure 14 by way of a fiber optic cable 40. An example embodiment of the interrogation system 38 uses optical frequency domain reflectometry (OFDR) to make many distributed strain measurements throughout the fiber optic sensor 10. OFDR can operate on the Rayleigh backscatter from the fiber optic sensor or on reflections from fiber Bragg grating (FBG) arrays. Other fiber optic strain measurement techniques may employ Raman scatter, Brillouin scatter, FBG point sensors, distributed FBG sensors, etc., and may localize the sensor strain information using time gating methods such as optical time domain reflectometry (OTDR) or wavelength division multiplexing (WDM).

The example interrogation system 38 provides discrete or continuous strain measurements along the longitudinal axis of the fiber. In a preferred but still example embodiment, the example interrogation system 38 uses OFDR interrogation to acquire high spatial resolution data from one or more fiber optic sensors aligned with the woven structure's axial direction. The strain measured in this axial direction by the example interrogation system 38 can be correlated to load applied based on the elastic modulus of the structure (relating stress and strain) and/or calibration of strain detected as a function of tension force applied.

The strain measurement signal can be used to detect damage to the filament structure based on identifiable features in the strain signal that are different than the strain signal due to tension. One example mode of damage detection is strength loss detection which is detectible as a change in modulus of the woven structure. When the filament structure is incorporated in an inflatable structure, for example, the axial strain can be correlated to the pressure of inflation through calibration. In addition, woven structures often experience creep deformation when load is applied over a certain time period. Creep in a woven strap manifests in the acquired strain signal as a slowly growing magnitude of tensile strain. Bending of the filament structure can be sensed when two or more sensors or two or more sensor paths of a single sensor are offset from a neutral plane of the woven structure. When the structure bends, one of the sensors or sensor paths is in compression while an opposite path is in tension. This sensor response can be calibrated to detect curvature or angle of bending of the woven structure. When the fiber optic sensor is not located on the neutral plane of the woven structure, or oscillates above and below the neutral plane (e.g., woven over and under weft filaments), a single fiber optic sensor's distributed strain signal exhibits periodic sections of compression and tension. The magnitude of these signals can be calibrated to the amount of curvature or angle of bending of the woven structure in the out-of-plane direction.

Individual example woven structures were tested. In an example test were predominantly made of nylon, tension loading was applied using an ADMET load frame tension tester. A distributed strain signal was measured using an example fiber optic interrogator corresponding to a distributed strain measurement system such as Luna's ODiSI platform. Cyclic loading of woven straps was applied, overall elongation was measured by the load frame and compared to the distributed strain measurements. Examples of distributed strain sensing in woven straps are described in "Integrated fiber optic structural health sensors for inflatable space habitats," Ohanian et al., Proc. SPIE 10172, A Tribute Conference Honoring Daniel Inman, 101720B (10 Apr. 2017). However, those results are for an optical fiber sensor bonded to the surface of a strap using a polymer that did not permeate the woven structure, and do not disclose the concepts of weaving the optical fiber internal to the strap, infusing the woven structure with a polymer, or weaving an optical fiber with buffer material into a filament structure and locally bonding it internally. As a result, the technology described in this application provides for more flexible filament structures with sensing capability and for superior strain coupling. Embedding the optical fiber provides more ruggedness to handling and allows for the benefits of the sensor being located on or near a neutral plane of the structure.

Several rounds of testing were performed on isolated woven straps where the optical fiber sensor was embedded with a thermoplastic buffer coating and heat activated to enhance strain coupling with the woven structure. The test specimens included 25 mm (2 inch) wide nylon webbing rated for 28.9 kN (6500 lb). Multiple loading cycles were performed to observe how the hysteresis of the woven strap changed over time. In addition, cyclic loading was combined with intentional damage applied to the woven strap. Load vs displacement curves for three cycles of an undamaged strap are shown in the graph of load vs. average strain in FIG. 5A.

Figure 5A:
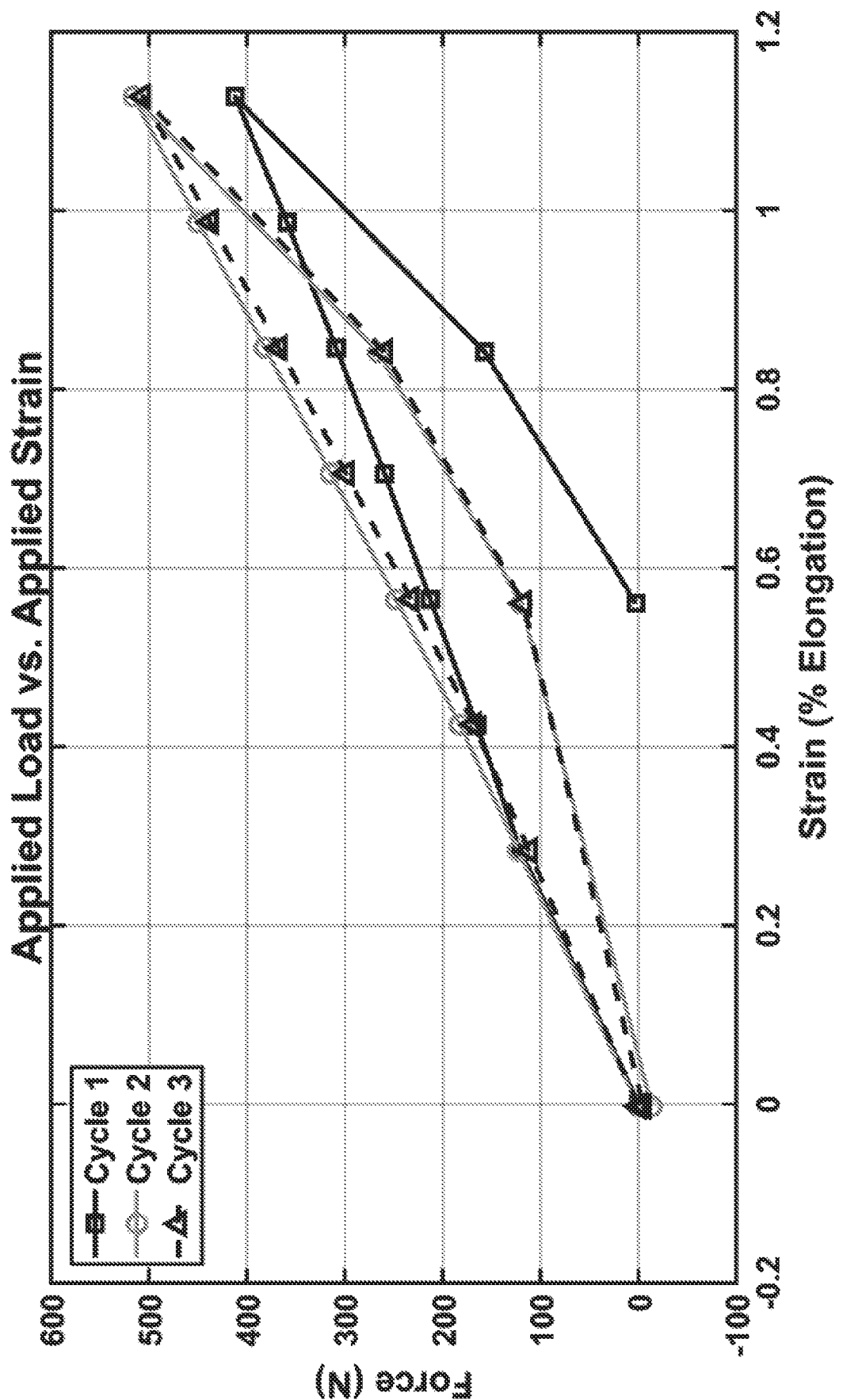
FIG. 5A shows example test results graphing load vs. displacement cycles of a tested nylon webbing with dual embedded fiber optic sensors internally bonded through heating of a buffer material.
Figure 5B:
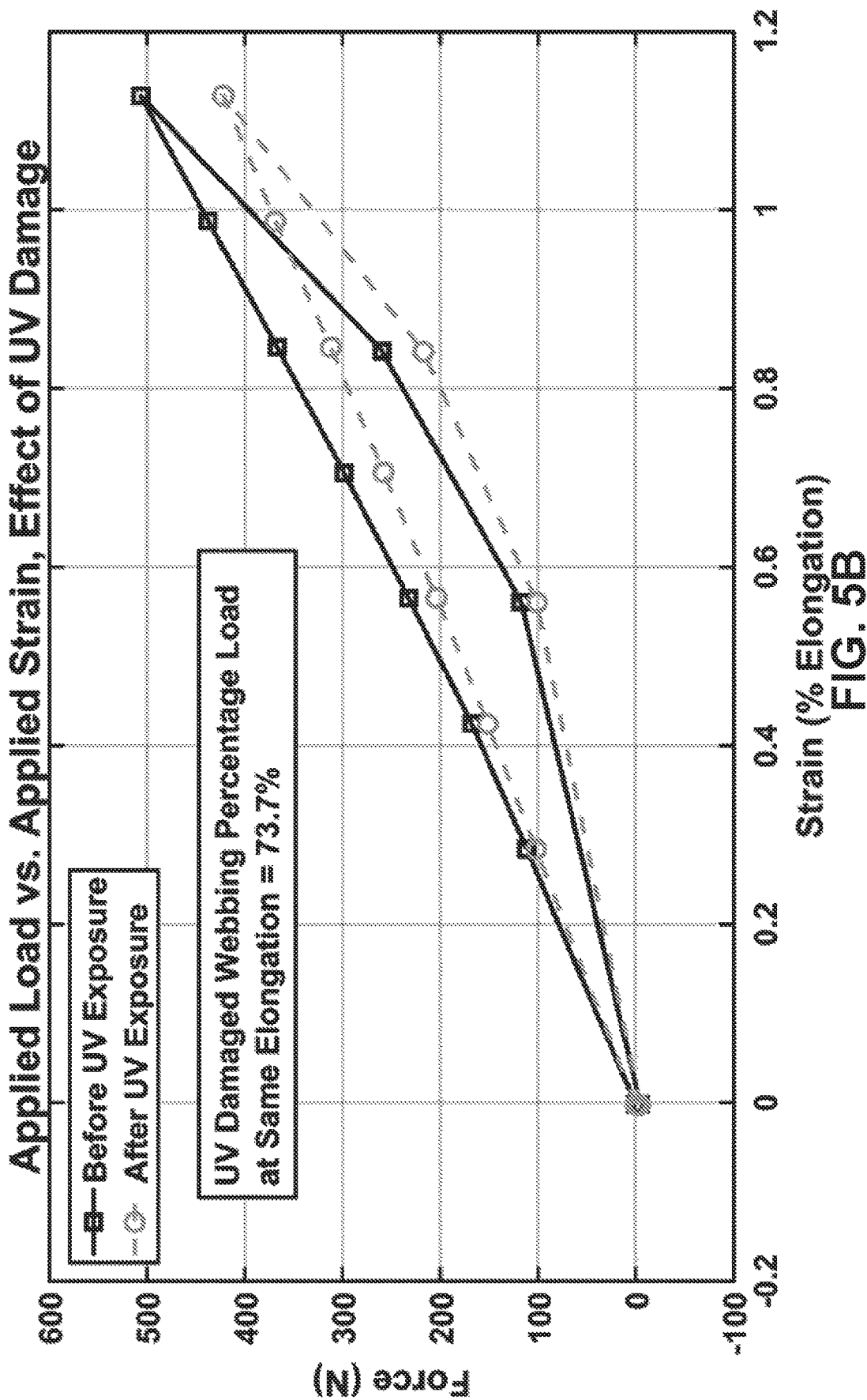
FIG. 5B shows example test results graphing load vs. displacement data to show the effect of damage caused by ultraviolet light exposure on the nylon strap.

FIG. 5A shows a natural hysteresis of the nylon woven strap with the average strain plotted as the elongation of the woven strap divided by the initial length. The first cycle exhibited a large amount of hysteresis due to the weave of the strap tightening under load. The second and third cycles show more repeatable behavior and are indicative of the hysteresis in the material. The nylon strap was exposed to accelerated weathering via ultraviolet (UV) light exposure. The strap was retested and the comparison of load vs. displacement for before and after UV damage is shown in FIG. 5B, where the strength of the webbing decreased on the order of 26%.

Figure 6A:
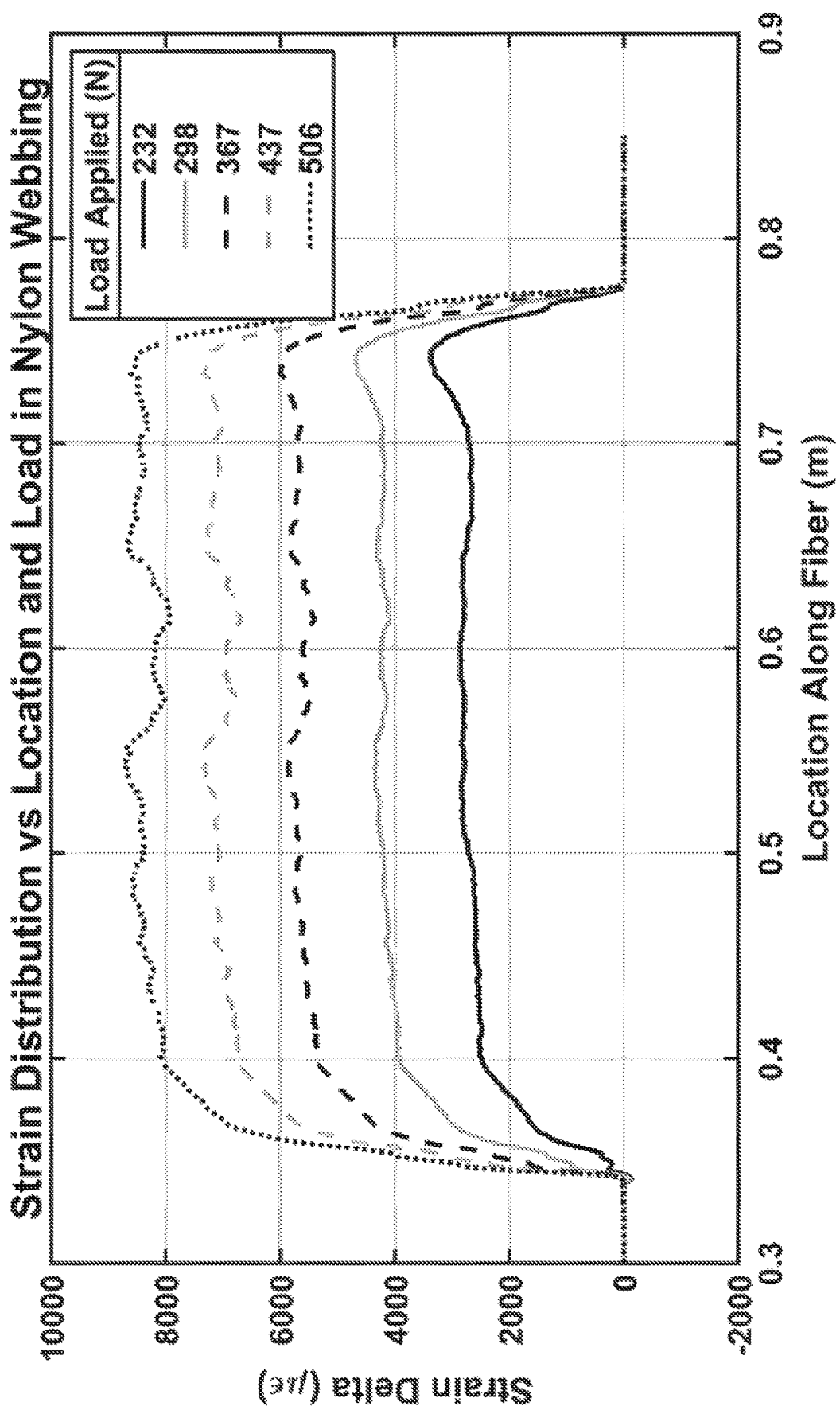
FIG. 6A illustrates example test results including strain profiles of the tested nylon strap during tension tests.
Figure 6B:
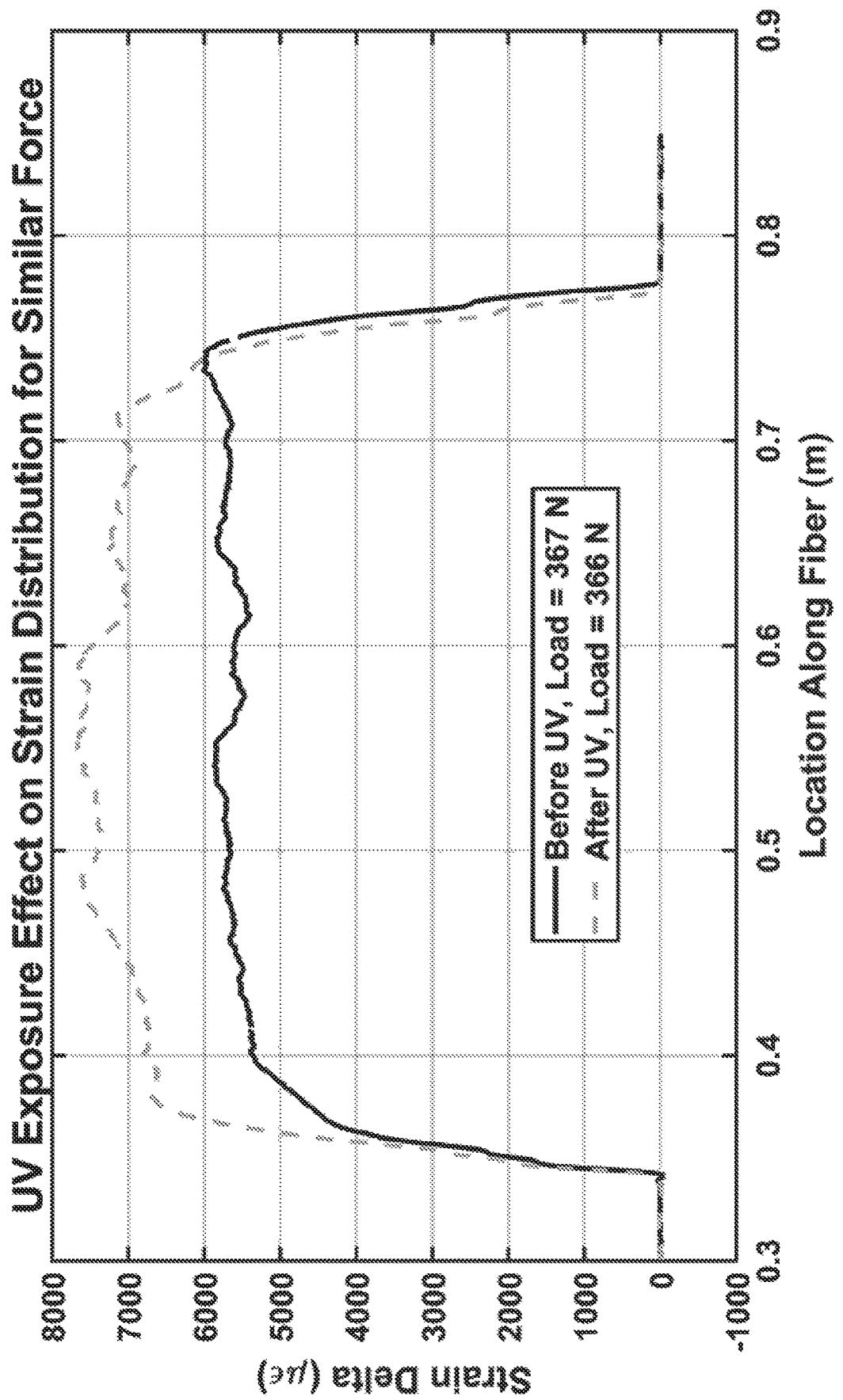
FIG. 6B shows example test data of the effect of damage caused by ultraviolet light exposure on the strain profile of the tested nylon strap.

Example fiber optic distributed strain data along the length of the sensor during these same tension tests is shown in FIGS. 6A and 6B. The data in FIG. 6A shows the maximum strain of roughly 8,000 µg applied. The middle section of each distributed strain measurement is relatively flat, with the edges gradually tending toward zero. This is attributed to the transition at the edge of the flexible bond of the sensing fiber experiencing no tension and then full tension once the edge effects are passed. Depending on the bonding material, these edge effect regions can be abrupt or gradual. It is beneficial to have a flat strain profile in the middle region that is indicative of the true strain in the woven strap. This region is the operational section used for subsequent measurements.

FIG. 6B shows example strain profiles for similar tensile loading before and after UV exposure damage. The webbing strains significantly more after UV damage implying a loss in modulus and strength. The reduction in modulus calculated from the data was 25% which agrees well with the load frame load vs. displacement data in FIG. 5B. This demonstrates the ability of the sensing technique to detect strength loss in webbing due to UV exposure.

Figure 7:
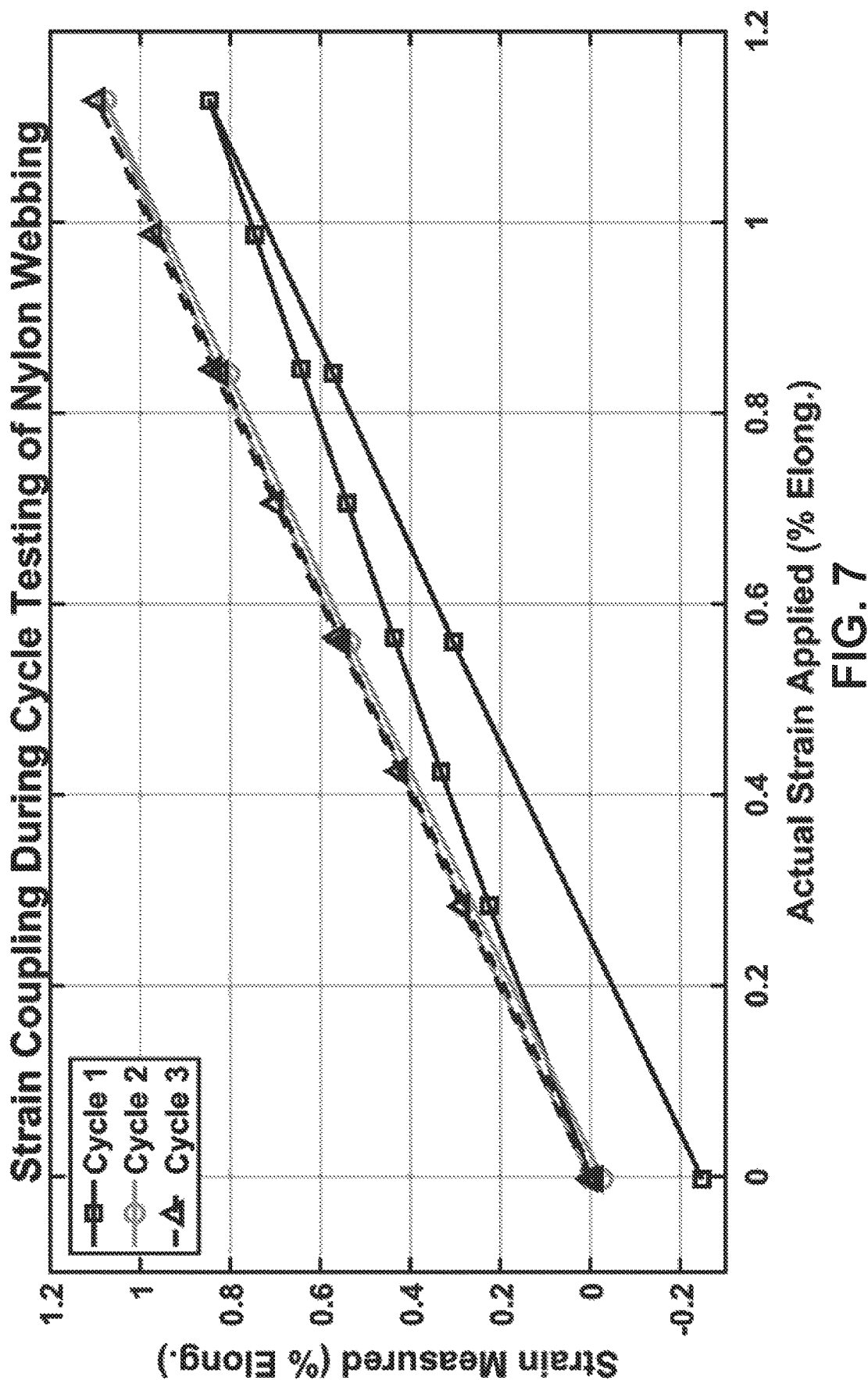
FIG. 7 shows example test results graphing measured strain vs. average applied strain of the nylon strap.

While the behavior of the tested nylon woven straps is nonlinear, the optical fiber sensor's measurement of strain is more linear with respect to the actual strain in the woven strap (after the initial stretching during cycle 1), as shown in measured strain vs. average strain graph of FIG. 7. Tension cycles 2 and 3 show relatively linear correlation with applied strain.

Figure 8A:
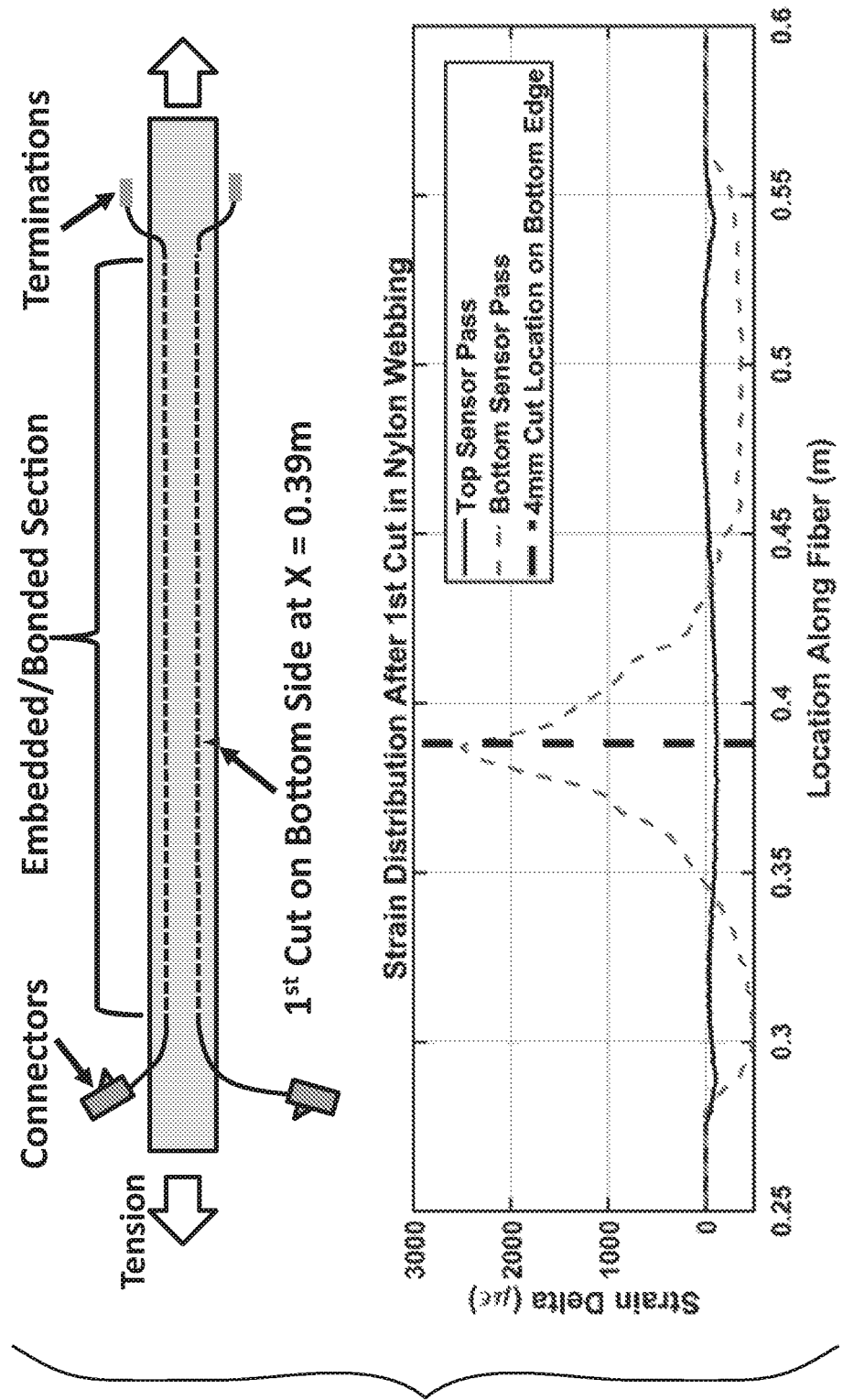
FIGS. 8A and 8B illustrate tension tests of a nylon strap with dual embedded fiber optic sensors internally bonded through heating of a buffer material, where damage is detected in response to a first cut on bottom edge of strap, and a second cut on a bottom edge of the strap.
Figure 8B:
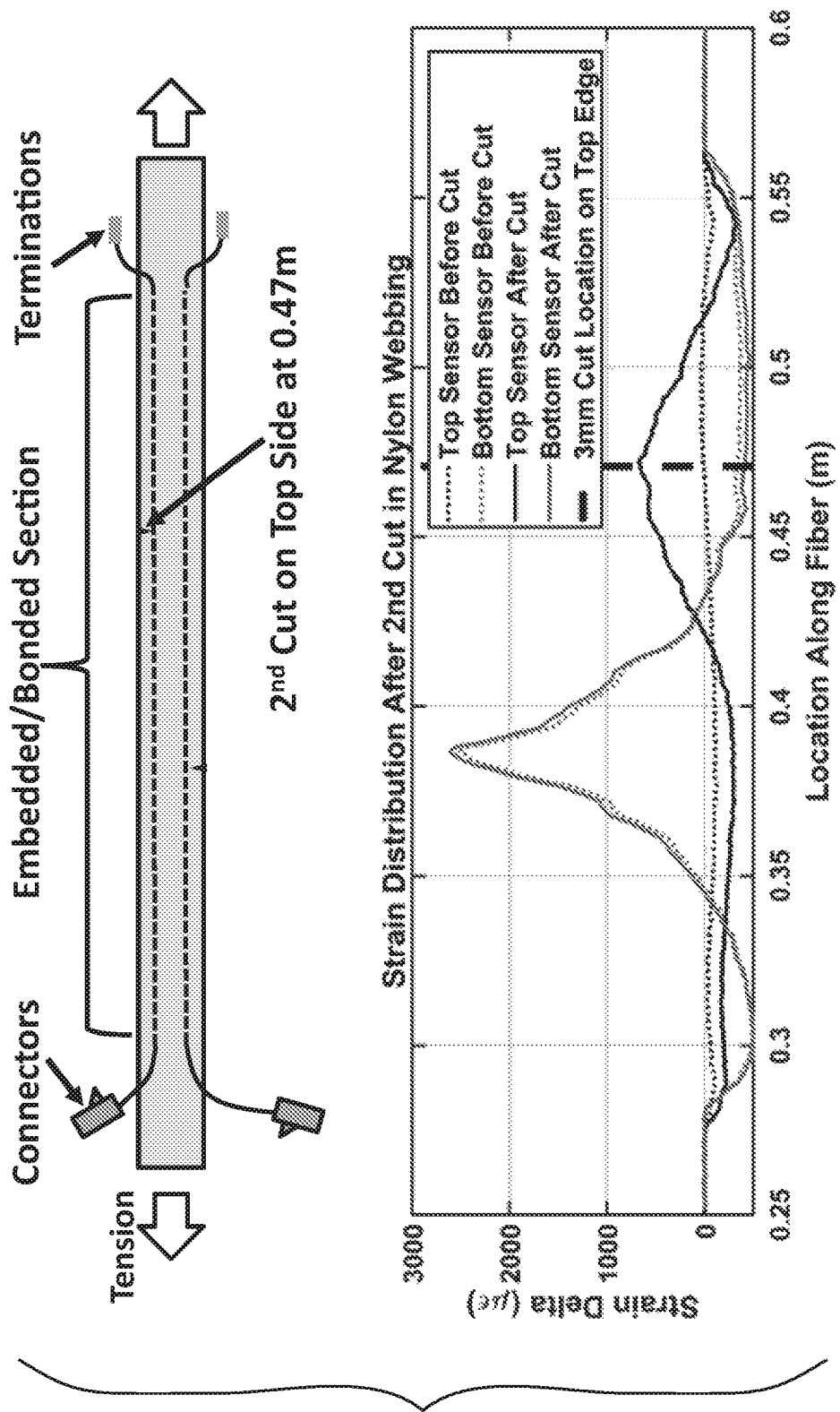

Next, an example of localized damage sensing capability of this example embedded optical fiber sensor is demonstrated. This test used a 50 mm wide Nylon webbing where a buffer coated optical fiber was woven into the webbing during manufacturing on the loom. The buffer material was melted through a heating post-process to provide a locally bonded interface between the optical fiber and the woven structure. FIG. 8A graphs strain delta vs. location along the woven strap after a 4 mm cut was applied to the bottom edge of the woven strap, the sensor on that side of the woven strap shows a localized strain increase, while the sensor on the top edge of the woven strap is unaffected. FIG. 8B shows the results when a 3 mm cut is applied to the top edge at a different location along the woven strap, with a noticeable localized strain increase in the top sensor and negligible effect on the bottom sensor. These test results demonstrate that damage as small as a 3 mm tear in a 50 mm (2") woven strap is identifiable with an example of the fiber optic sensing technology described in this application, and that the location along the woven strap and the directionality of which side of the woven strap was damaged can be clearly identified.

Figure 9A:
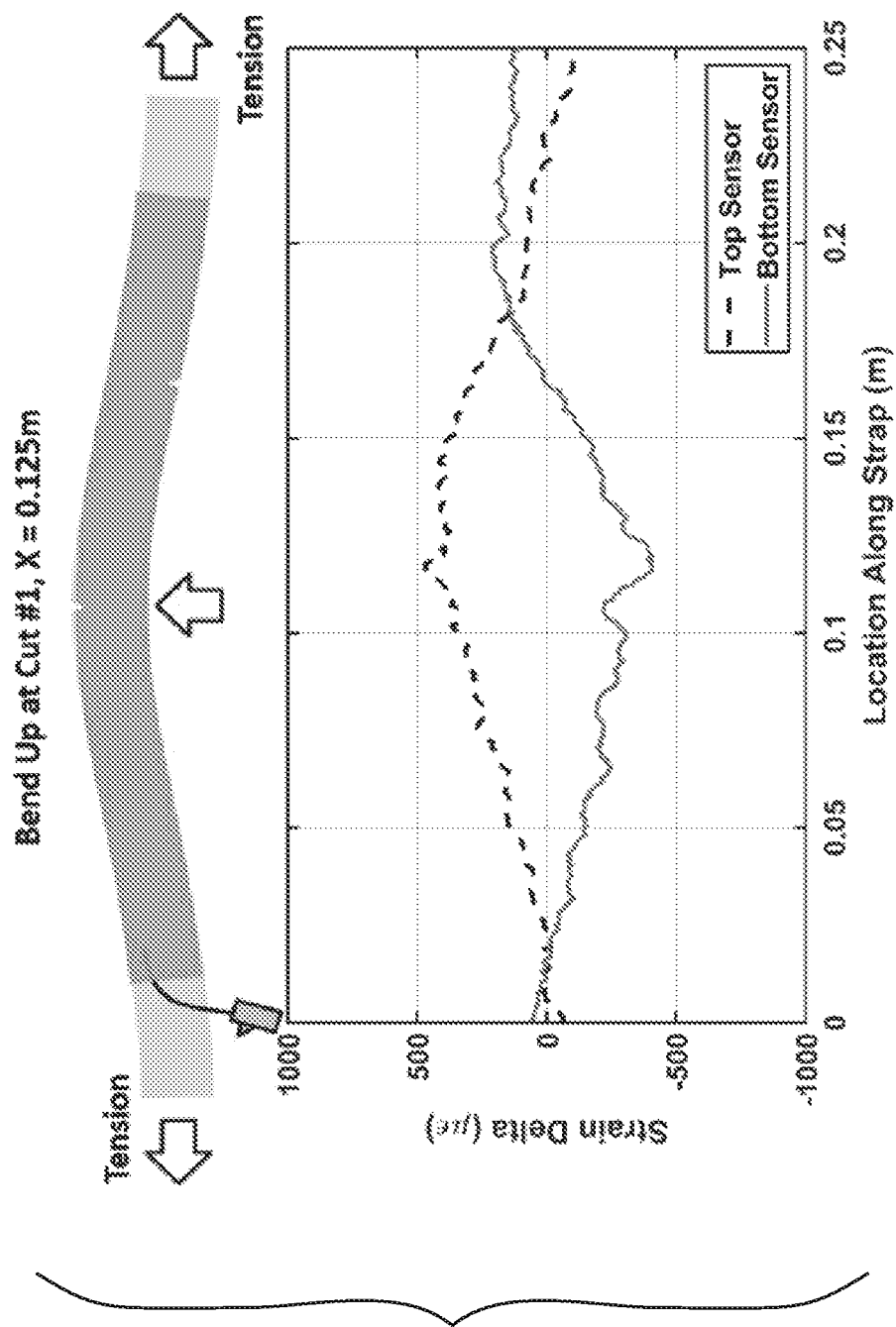
FIGS. 9A-9C illustrate for a Kevlar webbing with a dual pass sensor example tension test data for in-plane bending up, bending down, and detection of pre-existing cut damage to the strap after bending is complete.
Figure 9B:
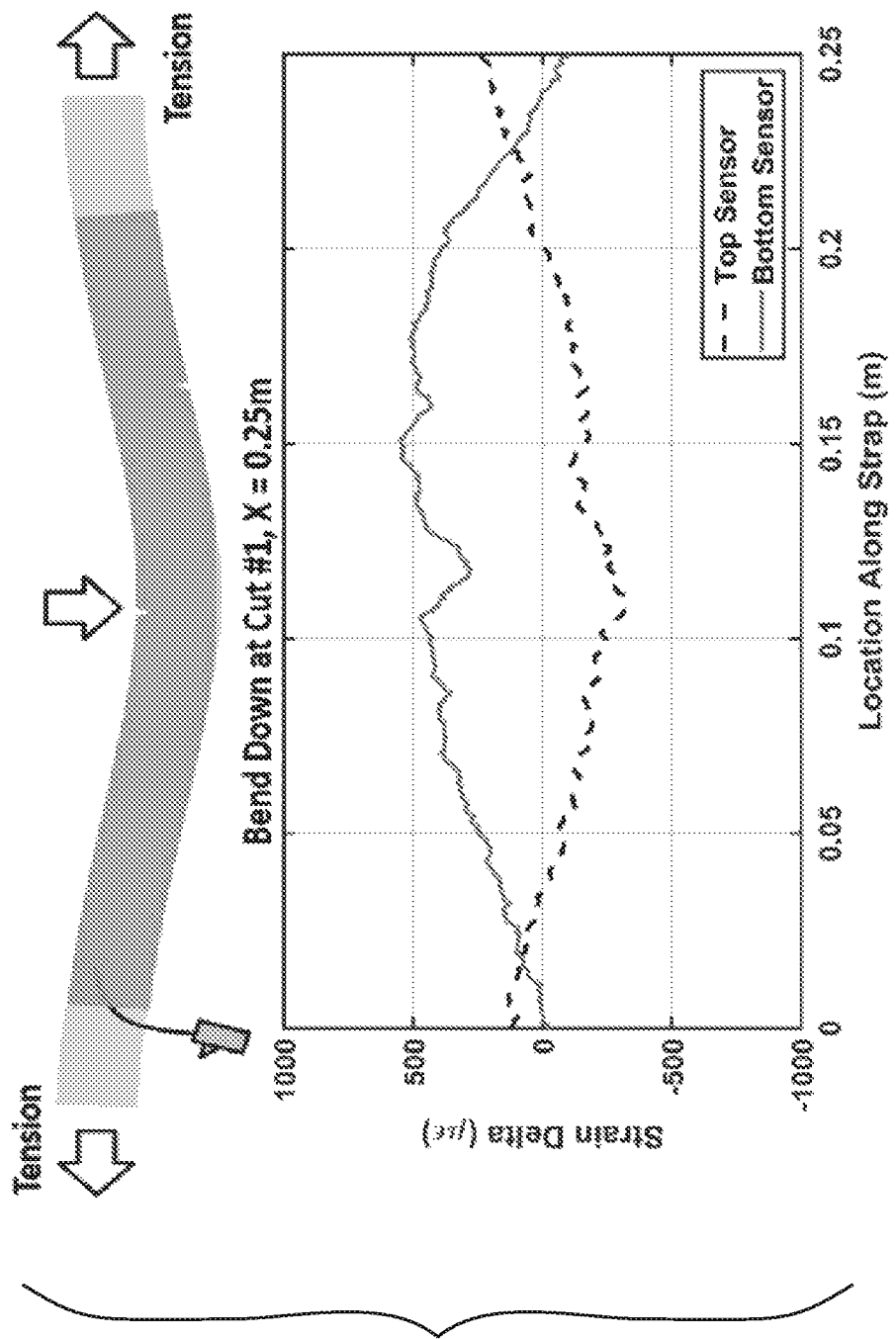
Figure 9C:
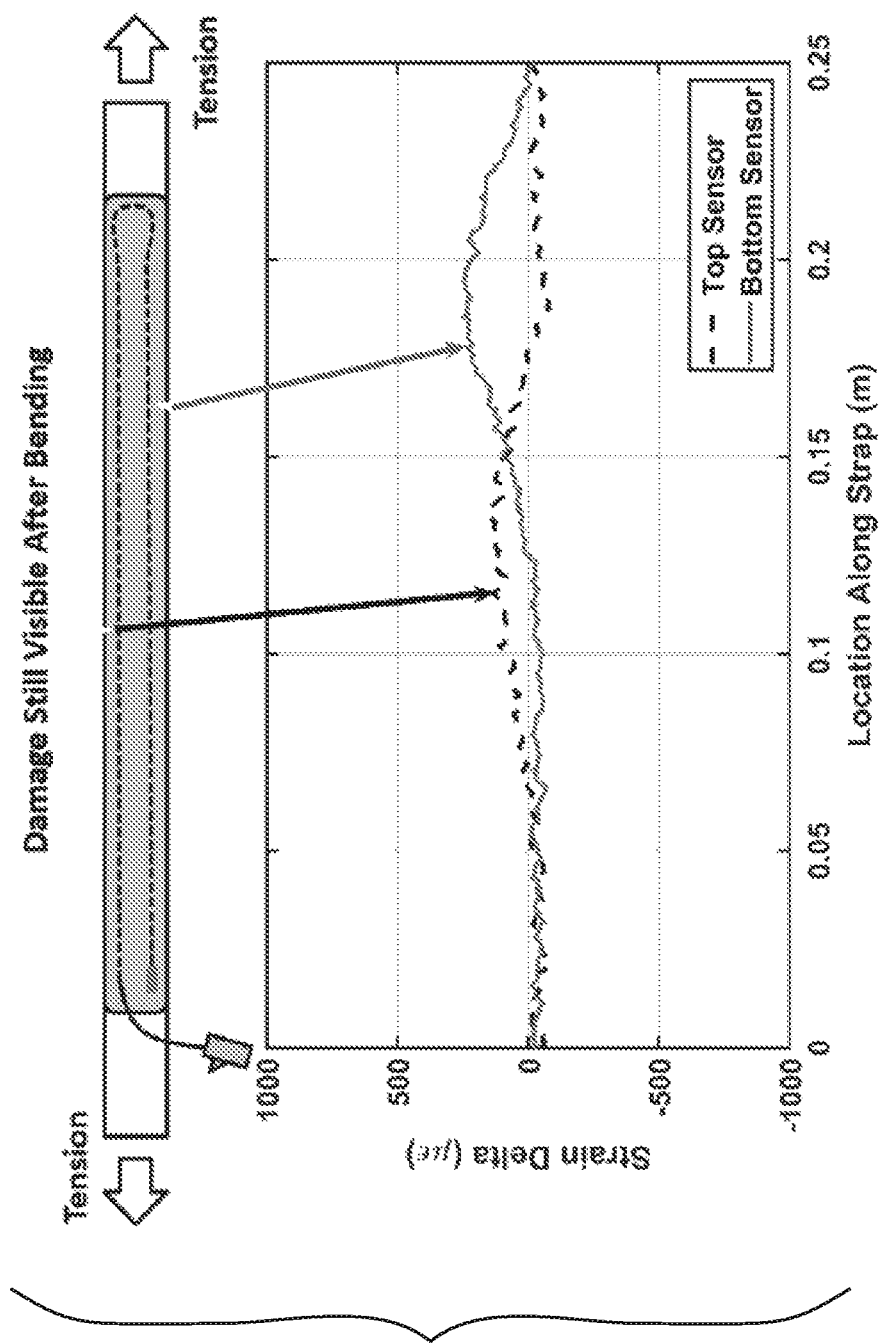

Another example using a dual pass sensing woven strap, a Kevlar strap with a surface bonded fiber optic sensor in this example, illustrates the ability to detect bending motions from the sensor output. The strap was previously damaged and was pulled in the width-direction (in-plane) at the locations where the notch cut had been applied. When the woven strap is bent towards the cut at x=125 mm (5"), the top optical fiber sensor experiences tension and the bottom sensor experiences compression relative to a baseline tension state (0.445 kN/100 lb of uniform tension). This is shown in the example strain profiles in FIGS. 9A-9C. In addition, these dynamic movements of the woven strap and the sensing of the bending loads did not alter the signature of the previous damage, which was still observable when the woven strap came to rest as shown in FIG. 9C. Thus, this dual pass sensor woven strap example can sense bending and damage independently. Bending of a strap within a larger assembly of woven structures may indicate damage in the assembly but not to the strap with sensing optical fibers, i.e., macro level damage. Detecting cuts or stress concentrations in the strap with sensing optical fibers demonstrates the ability to assess micro level damage. Thus, the sensing technology described in this application allows for structural health measurements of flexible filament structures and assemblies at a macro and micro level.

Stiffness created by infusing the flexible filament structure with an adhesive may be ameliorated by bonding the sensor to the flexible filament structure without infusing the entire flexible filament structure with adhesive. One example way to do this is by coating the fiber with a thermoplastic resin before weaving it into the flexible filament structure and then heating the flexible filament structure to melt the thermoplastic and create a local bond between the fiber and the filament material. In other cases, the polymer material may be impressionable and compressed during the weaving process to provide enough strain coupling without heat post-processing. In either case, the fiber optic sensor is effectively bonded to the flexible filament structure without the entire flexible filament structure being stiffened by additional adhesive, resin, or matrix material. Thermoplastics are one example adhesive that can be re-heated multiple times without effecting their adhesive properties. The adhesive, such as a thermoplastic, to coat the sensing fiber is dependent on its own material properties and that of the flexible filament structure the sensing fiber is being bonded to.

Figure 10:
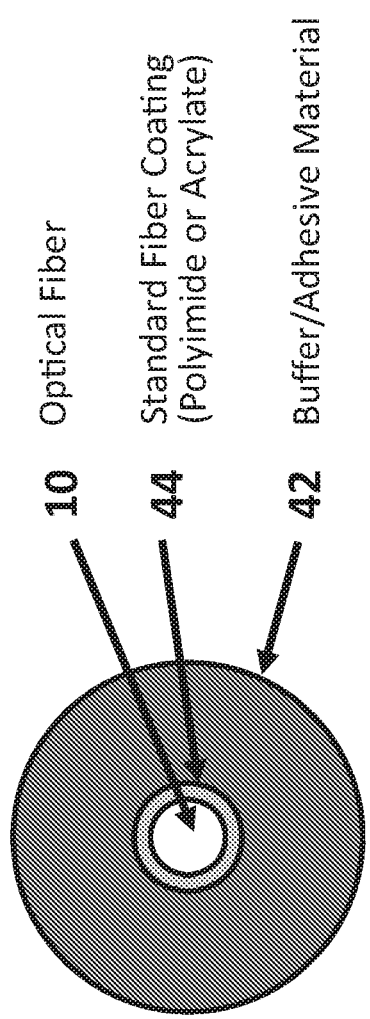
FIG. 10 shows a cross section of an example optical fiber coated with a buffer material for integration into a structure.

A cross section of an example coated fiber is shown in FIG. 10 where a buffer/adhesive material 42 is coated onto the fiber optic sensor 10 without removing the coating 44 that the optical fiber is manufactured with originally.

In another example embodiment for integrating the optical fiber sensor with a flexible filament structure, the fiber optic sensor is woven into the structure during fabrication, e.g., on a weaving loom. The fiber optic sensor can be located on or near a neutral plane 11 of the woven structure (shown in FIG. 2A and FIG. 11) so that out-of-plane bending of the woven structure does not cause strain in the fiber. In this example configuration, axial strain will be measured, though in other example embodiments, additional and/or different strains may be measured. In-plane bending can be sensed if multiple fiber optic sensors are woven into the woven structure on its horizontal neutral plane 11.

Figure 11:
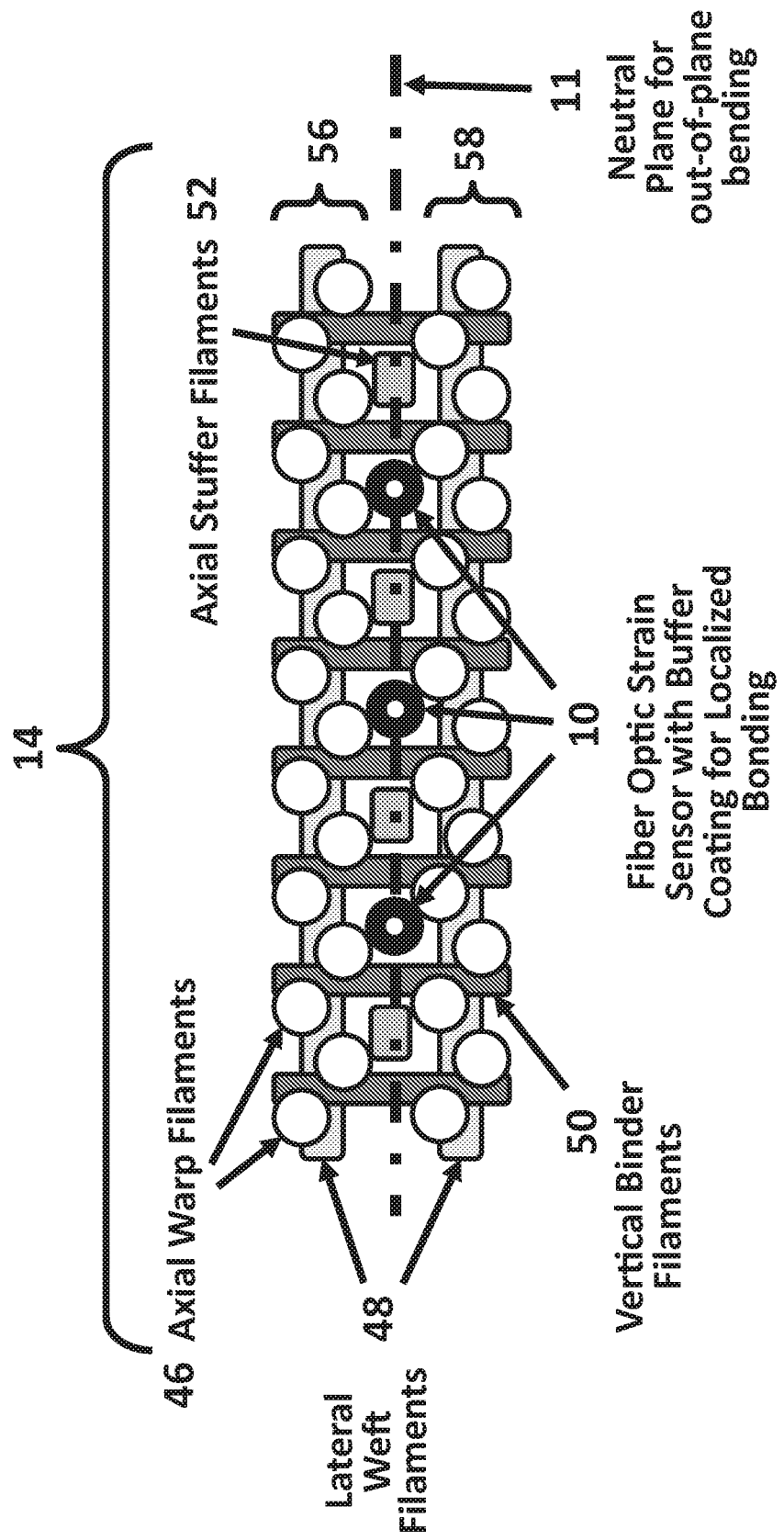
FIG. 11 shows an example embodiment where fiber optic sensors are woven on the neutral plane into a flexible filament structure for localized bonding.

FIG. 11 shows an example embodiment of an implementation of an optical fiber sensor woven into the filament structure 14 during the fabrication. In the weave pattern example shown in FIG. 11, axial warp filaments 46 are structural members of the filament structure 14. Lateral weft filaments 48 pass back and forth to hold the axial warps 46 in place. The axial stuffer filaments 52 fill the voids between the upper 56 and lower layers 58 of axial warp filaments 46 and add some load bearing capability in the warp direction. Vertical binder filaments 50 hold the upper and lower layers 56 and 58 of axial warp filaments 46 together vertically. The fiber optic strain sensors with a thermoplastic material 10 are preferably (though not necessarily) located in this example embodiment on the neutral plane 11 of the filament structure 14.

Localized bonding on the neutral plane 11 of the flexible filament structure results in more flexibility of the flexible filament structure, particularly for out-of-plane bending of the flexible filament structure. This approach avoids polymer infusion of the structural fibers furthest from the neutral plane 11 that can contribute to bending stiffness (e.g., like an I-beam structure).

Another example embodiment weaves the coated optical fiber as an axial warp filament over and under the lateral weft filaments. A thermoplastic material may be heated to increase strain coupling. In this case, the optical fiber does not lie on the neutral plane of the flexible filament structure but rather oscillates above and below this plane. Such an arrangement may be useful for measuring out-of-plane bending of the flexible filament structure or to determine radius of curvature.

After the optical fiber sensor is integrated into the flexible filament structure, the adhesive (e.g., thermoplastic) may be locally melted to adhere to the flexible filament structure fibers. This process can be done one of several ways including for example using conduction, convection, radiation, or induction. Conduction processing may include heated rollers or a heated press. Convection processing can be done using an oven with natural or forced convection, or using a localized heat gun. Radiative processing may be accomplished with a radiative heater or infrared heat gun. In order to use induction heating, the adhesive (e.g., thermoplastic) optical fiber material preferably (though not necessarily) contains conductive fibers or a solid conductor that responds to an electric field to create resistive heating. The amount of time spent at a heated temperature depends on the material thickness and the amount of time it takes to adequately integrate into the flexible filament structure. Heating temperature preferably (though not necessarily) also takes into account thermal properties of the flexible filament structure's structural filaments to avoid degrading the mechanical properties. For many applications, the flexible filament structure with integrated fiber is sufficiently adhered to the flexible filament structure for accurate strain sensing but also remains flexible and strong.

Example technical advantages of the flexible filament structure integrated with a fiber optical sensor include: being able to readily and accurately perform distributed strain measurements in flexible filament structures; maintaining flexibility of the flexible filament structure with bonded sensors as compared to infusing the entire flexible filament structure with resin; allowing sensors to be bonded on the internal neutral plane 11 of the flexible filament structure; weaving a coated fiber optic sensor (e.g., on loom) with the flexible filament structure and then bonding them together using a post-process heating compatible with mass production; embedding multiple sensors in the flexible filament structure to sense in-plane bending; the embedded sensors in the flexible filament structure detecting damage to the structure; the embedded sensors in the flexible filament structure being responsive to temperature through thermal expansion/contraction of the flexible filament structure; embedding or bonding the fiber optic sensor displaced from the neutral plane 11 or oscillating above and below the neutral plane 11 of the flexible filament structure to measure out-of-plane bending or radius of curvature of the flexible filament structure; and embedded fiber optic sensors in the flexible filament structure are more protected from unintended damage than surface mounted sensors.

Non-limiting example applications for the flexible filament structure integrated with a fiber optical sensor may include: distributed strain measurement in webbing/straps/belts; structural health monitoring of webbing/straps/belts; distributed strain measurement in fabric; structural health monitoring of fabric; structural health monitoring of inflatable structures constructed from flexible filament materials with embedded sensors; pressure sensing of inflatable structures constructed from flexible filament materials with embedded sensors; creep sensing of flexible filament structures; load sensing of flexible filament structures; and bending measurement of flexible filament structures.

Although the present disclosure has been described with reference to particular example embodiments and examples, it will be appreciated by those skilled in the art that the disclosure may be embodied in many other forms and is not limited to particular embodiments and examples.

All methods described herein can be performed in any suitable order unless otherwise indicated herein. The use of any and all examples, or example language (e.g., "such as") provided herein, is intended merely to better illuminate the example embodiments and does not pose a limitation on the scope of the claims appended hereto unless otherwise claimed.

As used herein, the singular forms "a," "an," and "the" may also refer to plural articles, i.e., "one or more," "at least one," etc., unless specifically stated otherwise.

The term "about" or "approximately" means an acceptable error for a particular recited value, which depends in part on how the value is measured or determined. In certain embodiments, "about" can mean 1 or more standard deviations. When the antecedent term "about" is applied to a recited range or value it denotes an approximation within the deviation in the range or value known or expected in the art from the measurements method. For removal of doubt, it is understood that any range stated herein that does not specifically recite the term "about" before the range or before any value within the stated range inherently includes such term to encompass the approximation within the deviation noted above.

Although the example embodiments above have been described in considerable detail, numerous variations and modifications will become apparent to those skilled in the art once the above disclosure is fully appreciated. It is intended that the following claims be interpreted to embrace all such variations and modifications.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus comprising:
   a woven structure to be monitored, and
   a fiber optic sensor with a curable or meltable material woven into the woven structure to produce a woven assembly that has an initial flexibility,
   wherein activation of the curable or meltable material after the woven assembly is produced locally bonds the fiber optic sensor to just one or more portions of the woven structure adjacent to the fiber optic sensor to create a local bond between the fiber optic sensor and the woven structure that transfers strain from the woven structure to the fiber optic sensor to allow the fiber optic sensor to detect strain on the woven structure, and wherein after the local bonding between the fiber optic sensor and the one or more portions of the woven structure, the woven assembly retains a high degree of the initial flexibility that is greater than a flexibility of the woven structure if more or all of the woven structure were infused with curable or meltable material.

2. The apparatus in claim 1, wherein the local bond provides a uniform strain coupling between the fiber optic sensor to detect strain on the woven structure and the fiber optic sensor.

3. The apparatus in claim 1, wherein the curable or meltable material includes one or more of: a thermoplastic, a thermoset resin, an adhesive, and a flexible polymer.

4. The apparatus in claim 1, wherein the curable or meltable material is arranged to maximize strain coupling between the fiber optic sensor and the woven structure through bonding.

5. The apparatus in claim 1, wherein the curable or meltable material is arranged to maximize frictional coupling between the fiber optic sensor and the woven structure.

6. The apparatus in claim 1, wherein the fiber optic sensor includes an optical fiber with a fiber coating and the curable or meltable material is on top of the fiber coating.

7. The apparatus in claim 1, wherein the fiber optic sensor includes an optical fiber with the curable or meltable material on top of the fiber.

8. The apparatus in claim 1, wherein the fiber optic sensor includes an optical fiber embedded within the woven structure along a longitudinal neutral plane of the woven structure.

9. The apparatus in claim 1, wherein the fiber optic sensor includes an optical fiber embedded within the woven structure along two or more longitudinal parallel axes of the woven structure with one end of the optical fiber being a fiber termination and the other end of the optical fiber coupled to a connector.

10. The apparatus in claim 1, wherein the fiber optic sensor includes two or more optical fibers embedded within the woven structure along two or more longitudinal parallel axes of the woven structure with one end of each optical fiber being a fiber termination and the other end of each optical fiber coupled to a connector.

11. The apparatus in claim 1, wherein the fiber optic sensor is bendable with the woven structure to detect one or more of: (i) bending of the woven structure in a plane that contains a longitudinal axis of the woven structure, (ii) bending out of the plane, and (iii) axial strain along a longitudinal axis of the filament structure.

12. The apparatus in claim 1, wherein the woven structure includes one or more of: Kevlar, Vectran, Nylon, Polyester, cotton, other synthetic, and organic-based fibers.

13. The apparatus in claim 1, wherein the woven structure includes one or more of: axial filaments, lateral filaments, and vertical filaments.

14. The apparatus in claim 13, wherein the woven structure includes a first layer of axial filaments and lateral filaments and a second layer of axial filaments and lateral filaments, wherein the vertical filaments extend to couple the first layer and the second layer, and wherein one or more fiber optic sensors are embedded between the first layer and the second layer.

15. A system comprising:
a woven structure to be monitored, and
a fiber optic sensor with a curable or meltable material woven into the woven structure to produce a woven assembly that has an initial flexibility,
wherein activation of the curable or meltable material after the woven assembly is produced locally bonds the fiber optic sensor to just one or more portions of the woven structure adjacent to the fiber optic sensor to create a local bond between the fiber optic sensor and the woven structure that transfers strain from the woven structure to the fiber optic sensor to allow the fiber optic sensor to detect strain on the woven structure, and
wherein after the local bonding between the fiber optic sensor and the one or more portions of the woven structure, the woven assembly retains a high degree of the initial flexibility that is greater than a flexibility of the woven structure if more or all of the woven structure were infused with curable or meltable material; and
a fiber optic interrogator optically coupled to the fiber optic sensor and configured to measure strain.

16. The system in claim 15, wherein the fiber optic interrogator is configured to use one or more of: Raman scatter, Brillouin scatter, FBG point sensors, distributed FBG sensors to measure strain in the fiber optic sensor.

17. The system in claim 15, wherein the fiber optic interrogator is an optical frequency domain reflectometry (OFDR)-based interrogator to measure strain in a continuous fashion with high spatial resolution based on light reflections from Rayleigh scatter in the fiber optic sensor.

18. The system in claim 15, wherein the fiber optic interrogator is an optical frequency domain reflectometry (OFDR)-based interrogator to measure strain based on light reflections from fiber Bragg gratings (FBG) in the fiber optic sensor.

19. The system in claim 15, wherein the fiber optic interrogator is configured to localize strain information associated with the fiber optic sensor using time optical time domain reflectometry (OTDR) or wavelength division multiplexing (WDM).

20. The system in claim 15, wherein the fiber optic interrogator is configured to determine distributed strain along a longitudinal axis of the woven structure and to determine from the distributed strain one or more of the following: an applied load to the woven structure, damage to the woven structure, pressure on the woven structure, a material creep of the woven structure, in-plane and/or out-of-plane bending or curvature of the woven structure, and a direction of damage to the woven structure.

21. A method comprising:
weaving a fiber optic sensor with a curable or meltable material woven into the woven structure to produce a woven assembly that has an initial flexibility;
after the woven assembly is produced, activating the curable or meltable material via heating or curing to locally adhere the fiber optic sensor to just one or more portions of the woven structure to create a local bond, where the local bond transfers strain from the woven structure to the fiber optic sensor to allow the fiber optic sensor to detect strain on the woven structure,
wherein after the local bond between the fiber optic sensor and the one or more portions of the woven structure, the woven assembly retains a high degree of the initial flexibility that is greater than a flexibility of the woven structure if more or all of the woven structure were infused with curable or meltable material.

22. The method in claim 21, wherein the heating uses one or more of conduction, convection, radiation, and induction.

23. The method in claim 21, wherein the fiber optic sensor includes an optical fiber, the method further comprising:

forming the curable or meltable material on the optical fiber or on a coating of the optical fiber.

24. The method in claim 21, further comprising:
generating the woven structure using axial filaments, lateral filaments, and vertical filaments, where the woven structure includes a first layer of axial filaments and lateral filaments and a second layer of axial filaments and lateral filaments and the vertical filaments extend to couple the first layer and the second layer, and
embedding one or more fiber optic sensors between the first layer and the second layer.

25. A method comprising:
embedding a fiber optic sensor with a buffer material in or on a flexible filament structure;
thereafter, activating the buffer material via heating or curing to locally adhere the fiber optic sensor to the flexible filament structure to create a local bond, where the local bond transfers strain from the flexible filament structure to the fiber optic sensor to allow the fiber optic sensor to detect strain on the flexible filament structure while maintaining flexibility in the flexible filament structure.

26. The method in claim 25, wherein the heating uses one or more of conduction, convection, radiation, and induction, and wherein the fiber optic sensor includes an optical fiber, the method further comprising:
forming the buffer material on the optical fiber or on a coating of the optical fiber.

27. The method in claim 25, further comprising:
generating the flexible filament structure using axial filaments, lateral filaments, and vertical filaments, where the woven structure includes a first layer of axial filaments and lateral filaments and a second layer of axial filaments and lateral filaments and the vertical filaments extend to couple the first layer and the second layer, and
embedding one or more fiber optic sensors between the first layer and the second layer.

28. An apparatus comprising:
a flexible filament structure, and
a fiber optic sensor with a buffer material that locally bonds the fiber optic sensor to the flexible filament structure to create a bond between the fiber optic sensor and the flexible filament structure to transfer strain from the flexible filament structure to the fiber optic sensor to allow the fiber optic sensor to detect strain on the flexible filament structure while maintaining flexibility in the flexible filament structure,
wherein the buffer material is arranged to maximize one or both of:
strain coupling between the fiber optic sensor and the flexible filament structure through bonding, and
frictional coupling between the fiber optic sensor and the flexible filament structure.

29. An apparatus comprising:
a flexible filament structure, and
a fiber optic sensor with a buffer material that locally bonds the fiber optic sensor to the flexible filament structure to create a bond between the fiber optic sensor and the flexible filament structure to transfer strain from the flexible filament structure to the fiber optic sensor to allow the fiber optic sensor to detect strain on the flexible filament structure while maintaining flexibility in the flexible filament structure,
wherein the woven structure includes a first layer of axial filaments and lateral filaments and a second layer of axial filaments and lateral filaments, wherein the vertical filaments extend to couple the first layer and the second layer, and wherein one or more fiber optic sensors are embedded between the first layer and the second layer.

* * * * *